US006561136B2

(12) United States Patent
Kuntz

(10) Patent No.: US 6,561,136 B2
(45) Date of Patent: May 13, 2003

(54) ELECTRONIC DEVICE FOR VETERINARY PATIENTS

(76) Inventor: Charles Kuntz, 6651 F Backfield Rd., Springfield, VA (US) 22150

( * ) Notice: Subject to any disclaimer, the term of this patent is extended or adjusted under 35 U.S.C. 154(b) by 0 days.

(21) Appl. No.: 10/186,894

(22) Filed: Jul. 2, 2002

(65) Prior Publication Data

US 2003/0024486 A1 Feb. 6, 2003

Related U.S. Application Data

(60) Provisional application No. 60/309,513, filed on Aug. 3, 2001.

(51) Int. Cl.[7] .............................................. A01K 37/00

(52) U.S. Cl. ...................... 119/712; 119/850; 119/882

(58) Field of Search ............................... 119/712, 850, 119/822, 908, 856, 859; 54/82

(56) References Cited

U.S. PATENT DOCUMENTS

| | | | | | |
|---|---|---|---|---|---|
| 2,177,789 | A | | 10/1939 | Sacker | |
| 3,042,036 | A | | 7/1962 | Abadjieff | |
| 3,543,724 | A | * | 12/1970 | Kirkpatrick | 119/702 |
| 4,153,009 | A | | 5/1979 | Boyle | |
| 4,355,600 | A | * | 10/1982 | Zielinski | 119/850 |
| 4,398,545 | A | | 8/1983 | Wilson | |
| 5,207,178 | A | * | 5/1993 | McDade et al. | 119/859 |
| 5,374,283 | A | * | 12/1994 | Flick | 607/46 |
| 5,540,735 | A | * | 7/1996 | Wingrove | 607/46 |
| 5,864,292 | A | | 1/1999 | Roestenberg et al. | |
| 5,896,830 | A | | 4/1999 | Stampe | |
| 5,911,199 | A | * | 6/1999 | Farkas et al. | 119/859 |
| 6,000,366 | A | * | 12/1999 | Reeping | 119/850 |
| 6,184,790 | B1 | | 2/2001 | Gerig | |
| 6,234,117 | B1 | * | 5/2001 | Spatt | 119/850 |
| 6,453,850 | B1 | * | 9/2002 | Stampe | 119/712 |
| 6,487,992 | B1 | * | 12/2002 | Hollis | 119/712 |

FOREIGN PATENT DOCUMENTS

| | | | | | |
|---|---|---|---|---|---|
| FR | 2680631 | A1 | * | 3/1993 | A01K/15/02 |
| GB | 2192323 | A | * | 1/1988 | A01K/29/00 |

* cited by examiner

*Primary Examiner*—Peter M. Poon
*Assistant Examiner*—Joan M. Olszewski
(74) *Attorney, Agent, or Firm*—Richard C Litman

(57) ABSTRACT

An electronic device which prevents a veterinary patient from licking and mutilating, medical appliances which are attached to the patient. The medical appliances may include bandages, splints, catheters, fluid administration sets, etc. The electronic device comprises a housing containing electronic circuitry powered by two series-connected, replaceable nine volt batteries. A negative electrode and a positive electrode extend from the housing. The electrodes are attached to the patient's body in a manner to form an open circuit. A mild, but convincing, shock is produced if the patient attempts to lick or chew the medical appliance.

11 Claims, 5 Drawing Sheets

ELECTRONIC DEVICE FOR VETERINARY PATIENTS

CROSS-REFERENCE TO RELATED APPLICATION

This application claims the benefit of U.S. Provisional Patent Application Ser. No. 60/309,513, filed Aug. 3, 2001.

BACKGROUND OF THE INVENTION

1. Field of the Invention

The present invention generally relates to medical devices. More specifically, the present invention is drawn to an electrical device which prevents an animal from licking or chewing a wound-covering bandage, a splint, or an attached medical appliance.

2. Description of Related Art

Unfortunately animals, like humans, sometimes engage in activities that produce injuries. A beloved dog or cat, the bear in the zoo, the cow in the barn, etc., may cut a forepaw or break a leg or have some injury occur which requires the use of a protective covering such as a bandage or the like. Unlike humans however, the animal's instinct is to lick the wound. Thus, the bandage is regarded as an impediment of which to be rid. The animal will lick at or chew on the bandage, thereby mutilating it and negating the protective intent. This scenario enhances the chances for infection and prolongs the healing process.

A simplistic, efficient, effective device that would discourage this instinctive behavior would surely be a welcome addition to the art.

There are several devices in the prior art utilized for discouraging animals from licking or chewing in areas adjacent wounds. For example U.S. Pat. No. 4,153,009 (Boyle) shows an electric device adapted to be positioned around a bandage on an animal. The device will produce a mild electric shock if the animal attempts to bite, lick or chew the bandage. The Boyle device uses two nine volt batteries to provide the electrical shock. It is to be noted that the device of the instant patent is limited in that it can be employed only in an anatomical area encompassed by the relatively narrow width of the flexible mounting band.

U.S. Pat. No. 5,896,830 (Stampe) also shows an electrical device that will produce a mild shock if an animal licks in an area adjacent a wound. The anatomical area encompassed by the Stampe device appears to be even more limited than that of the above cited patent. Moreover, the Patentee contemplates providing a voltage output of only four to six volts which is not enough to discourage persistent animals from licking and/or chewing.

U.S. Pat. No. 3,042,036 (Abadjieff) shows a bandage which would cause pain when the animal attempts to lick or chew the bandage. Besides pain, the sharp points would also inflict wounds to the animal thereby creating a second medical situation.

U.S. Pat. No. 2,177,789 (Sacker) is drawn to an electrical device to discourage a farm animal, especially a bull, from butting. There is no contemplation to use the device as a medical device to discourage licking a wound.

U.S. Pat. No. 5,864,292 (Rostenberg et al.) discloses an electric shock guard adapted to be attached to the top of a garbage can to discourage animals from tampering with the can. No provision is made to adapt the instant device to be attached to an animal's anatomy.

U.S. Pat. No. 4,398,545 (Wilson) pertains to an electrical device for blocking or masking pain in a human patient. There is no teaching for applying the device to protect an injury to an animal.

U.S. Pat. No. 6,184,790 B1 (Gerig) discloses a receiver unit for use in animal behavior modification. The receiver employs relatively complex circuitry and requires the use of a remote signaling device.

None of the above inventions and patents, taken either singly or in combination, is seen to disclose an electronic device to discourage animals from licking and/or mutilating bandages or medical appliances as will subsequently be described and claimed in the instant invention.

SUMMARY OF THE INVENTION

The instant invention is a device which prevents a veterinary patient from licking and mutilating a medical appliance which is attached to the patient. The medical appliance may include but is not restricted to a bandage, splints, catheter, fluid administration set, etc. The device comprises a housing containing electronic circuitry powered by two series-connected, replaceable nine volt batteries.

A negative electrode and a positive electrode extend from the housing. The negative electrode is attached to the patient's body in an area adjacent the injury or medical appliance. An electrocardiogram adhesive lead or the like can be used to effect the attachment of the negative electrode. A conventional bandage may then be applied to afford protection for the area and to further secure the negative electrode to the area.

A flexible material, which has an electrically conductive outer surface and an electrically insulated inner surface, is utilized to cover the bandaged area. The flexible material may be cut to any size whereby the material may be made to extend over any desired anatomical area. The positive electrode is attached to the outer, conductive surface. When the patient attempts to lick or chew the area desired to be, protected, a circuit is completed causing the device to emit a small but convincing shock to discourage the patient from further contact with the protected area.

The concept and apparatus of the instant invention is simplistic and effective. The desired anatomical area is protected without the use of confining cages or uncomfortable Elizabethan collars. The animal patient is able to maneuver and perform normal functions, only limited by the injury itself.

Accordingly, it is a principal object of the invention to provide a medical device adapted for use on veterinary patients.

It is another object of the invention to provide a medical device to discourage veterinary patients from licking and/or biting medical appliances attached thereto.

It is a further object of the invention to provide a medical device for veterinary patients, which device is portable and self-contained.

Still another object of the invention is to provide a medical device for veterinary patients, which device is durable and easy to operate.

It is an object of the invention to provide improved elements and arrangements thereof in a device for the purposes described which are inexpensive, dependable and fully effective in accomplishing their intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
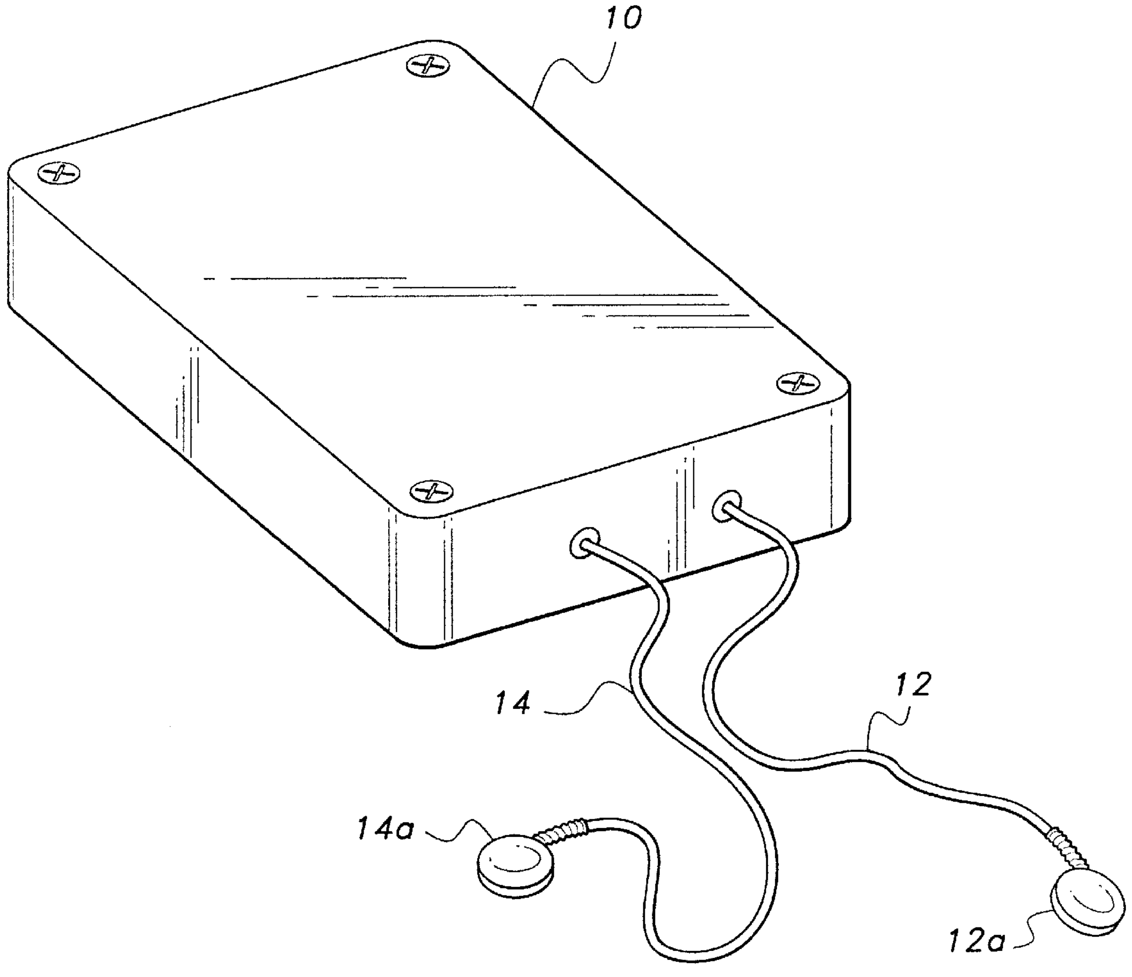
FIG. 1 is a perspective view of an electronic device to discourage veterinary patients from licking and mutilating medical appliances according to the present invention.

The electronic control circuitry (not shown) of the present invention is housed in casing 10 as best illustrated in FIG. 1.

The circuitry is conventional and is not, per se, part of the inventive concept. The circuitry is powered by two nine volt batteries which are also housed in casing 10. The top of casing 10 is removable so that the batteries may be replaced when necessary. A pair of electrically conductive wires 12, 14 extend outwardly from the casing. Each wire has an inner end (not shown) connected to the circuit inside casing 10. Wire 12 has an outer end which terminates in a negative electrode at 12*a*. Wire 14 terminates in a positive electrode at 14*a*. Wires 12 and 14 are covered with electrical insulation to avoid short circuiting.

Figure 2:
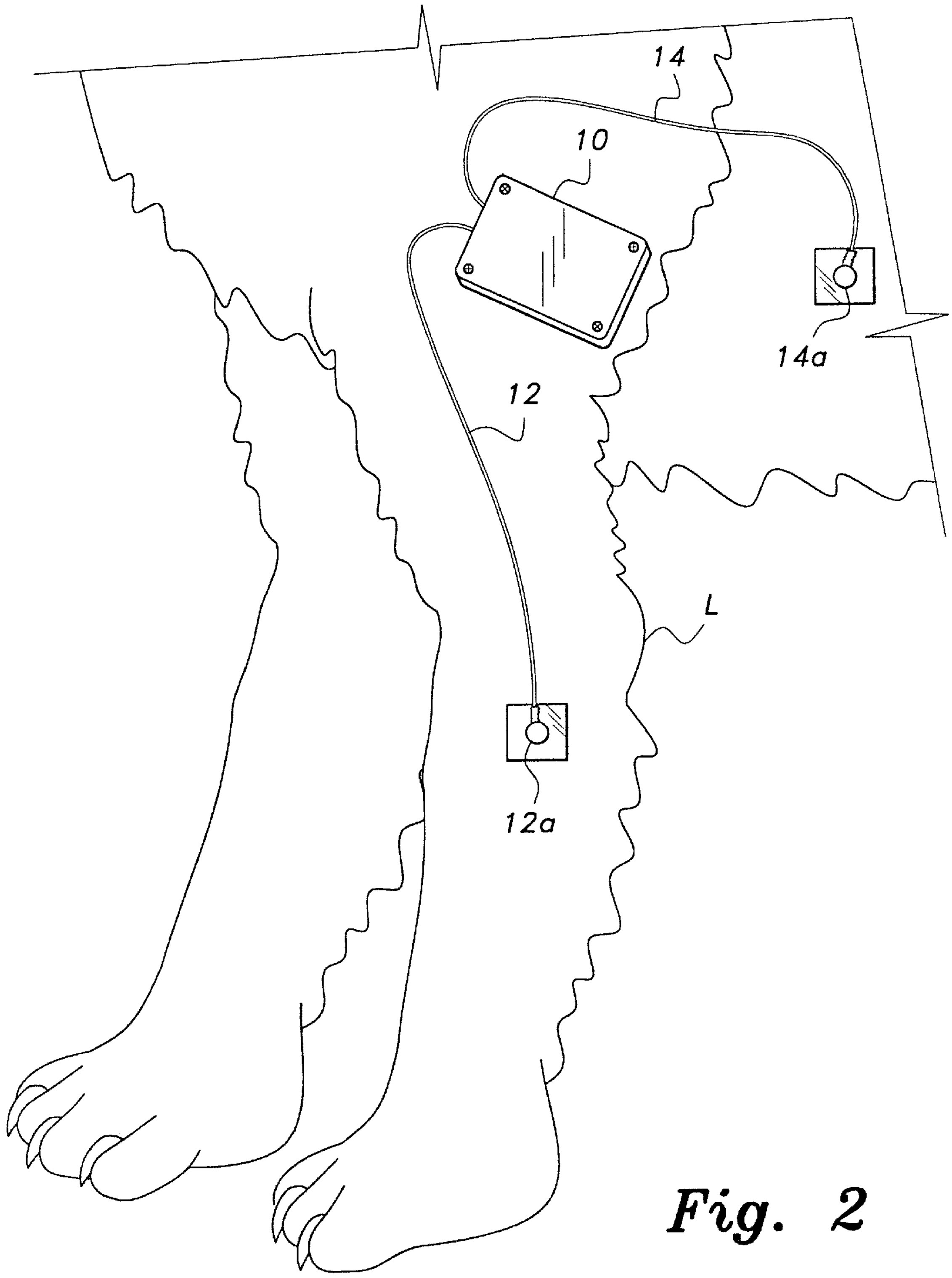
FIG. 2 is a perspective view illustrating a first step in applying the invention to the leg of a veterinary patient according to the present invention.
Figure 3:
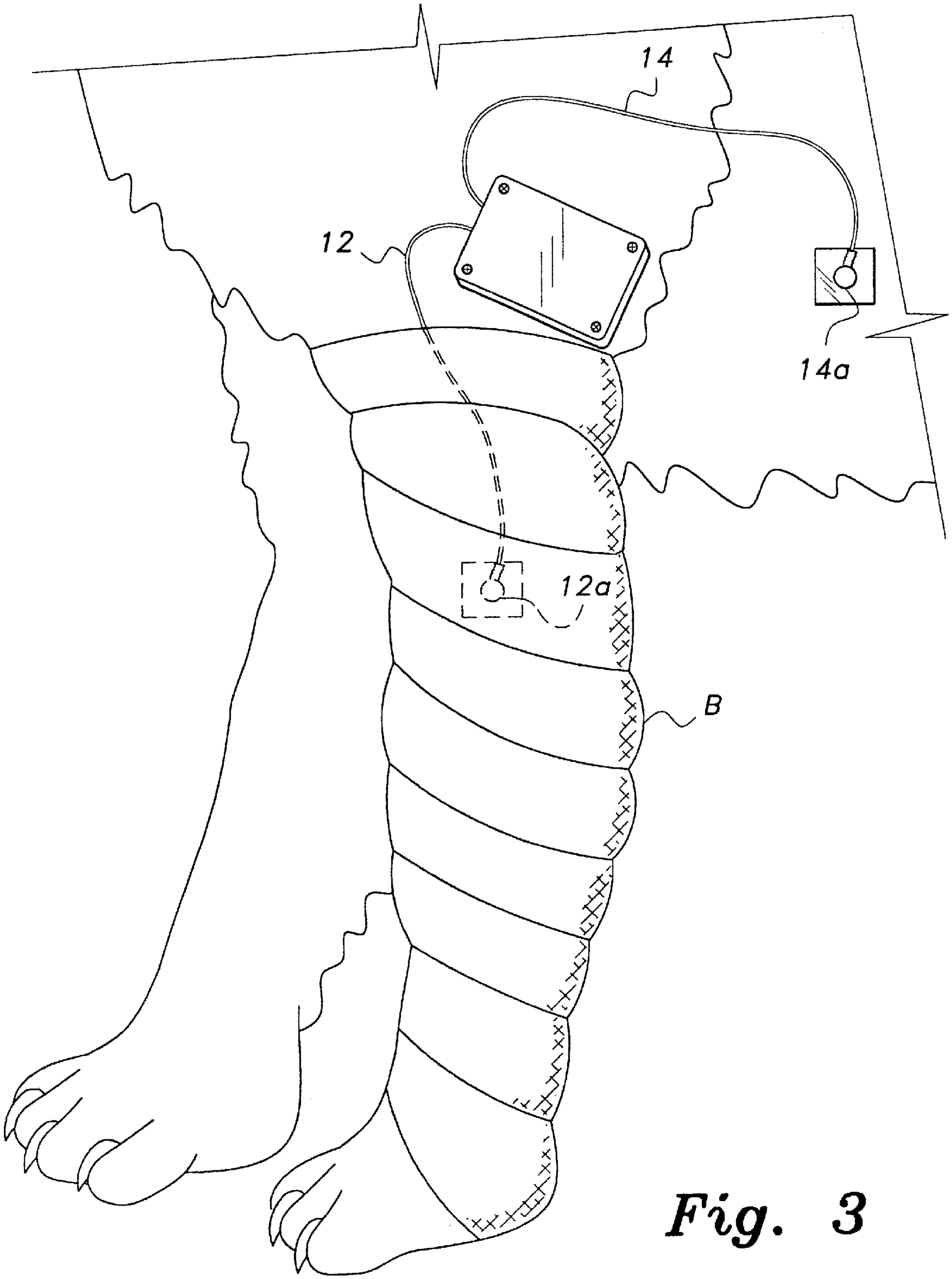
FIG. 3 is a perspective view illustrating a second step in applying the invention to the leg of a veterinary patient according to the present invention.
Figure 4:
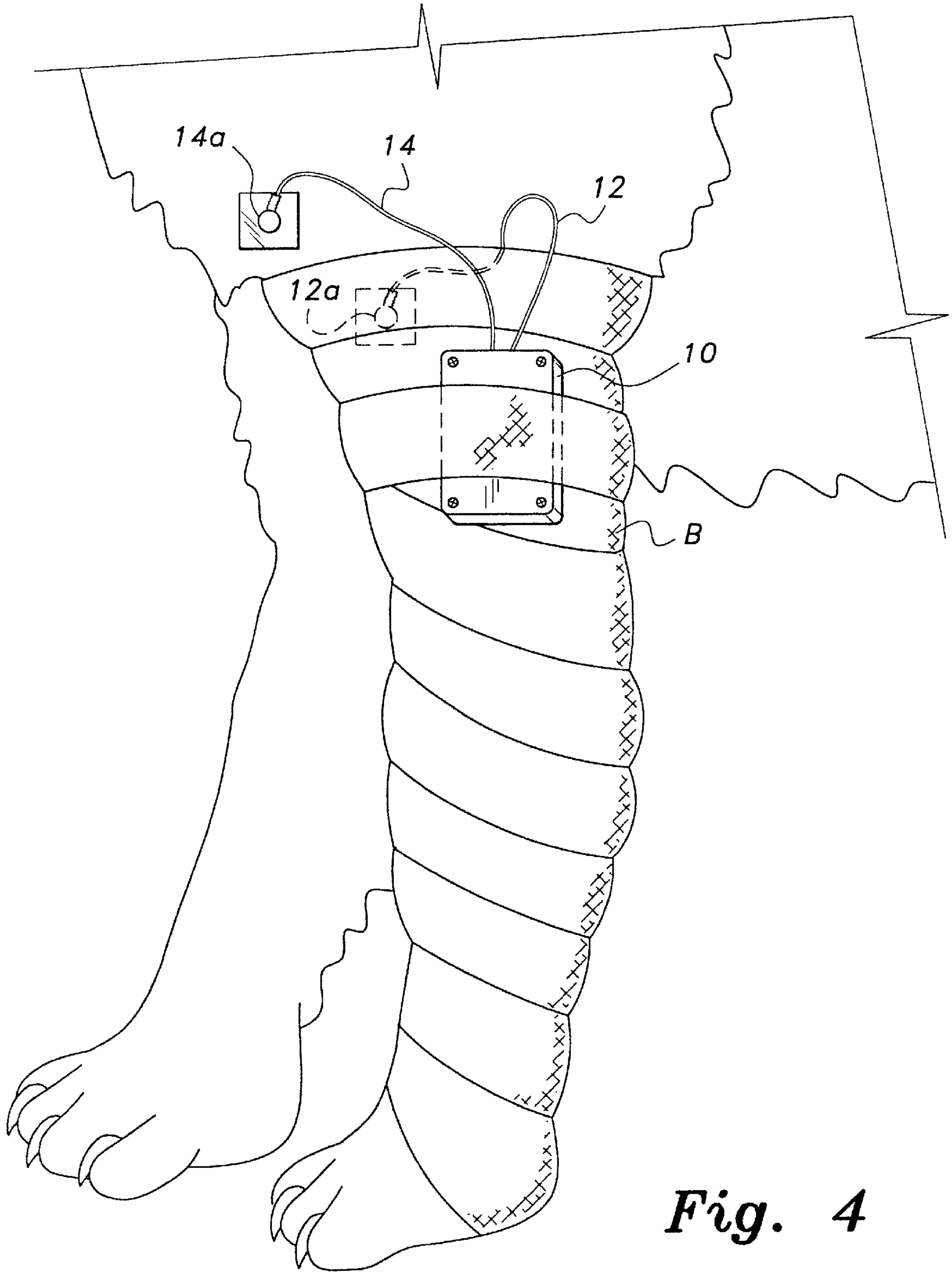
FIG. 4 is a perspective view illustrating a third step in applying the invention to the leg of a veterinary patient according to the present invention.

FIGS. 2–4 are illustrative of one example as to how the invention is applied. In FIG. 2, the injured leg of a patient is depicted at L. The-initial step in the procedure requires that the negative electrode 12*a* be secured to the leg in an area adjacent the injury. As noted above, electrode 12*a* may be secured with a conventional electrocardiogram adhesive lead or the like.

A conventional bandage B, as shown in FIG. 3, is utilized to cover the injured area and to further secure the negative electrode 12*a* to the injured area. Casing 10 is wrapped into the bandage B to be incorporated and supported therein (FIG. 4).

Figure 5:
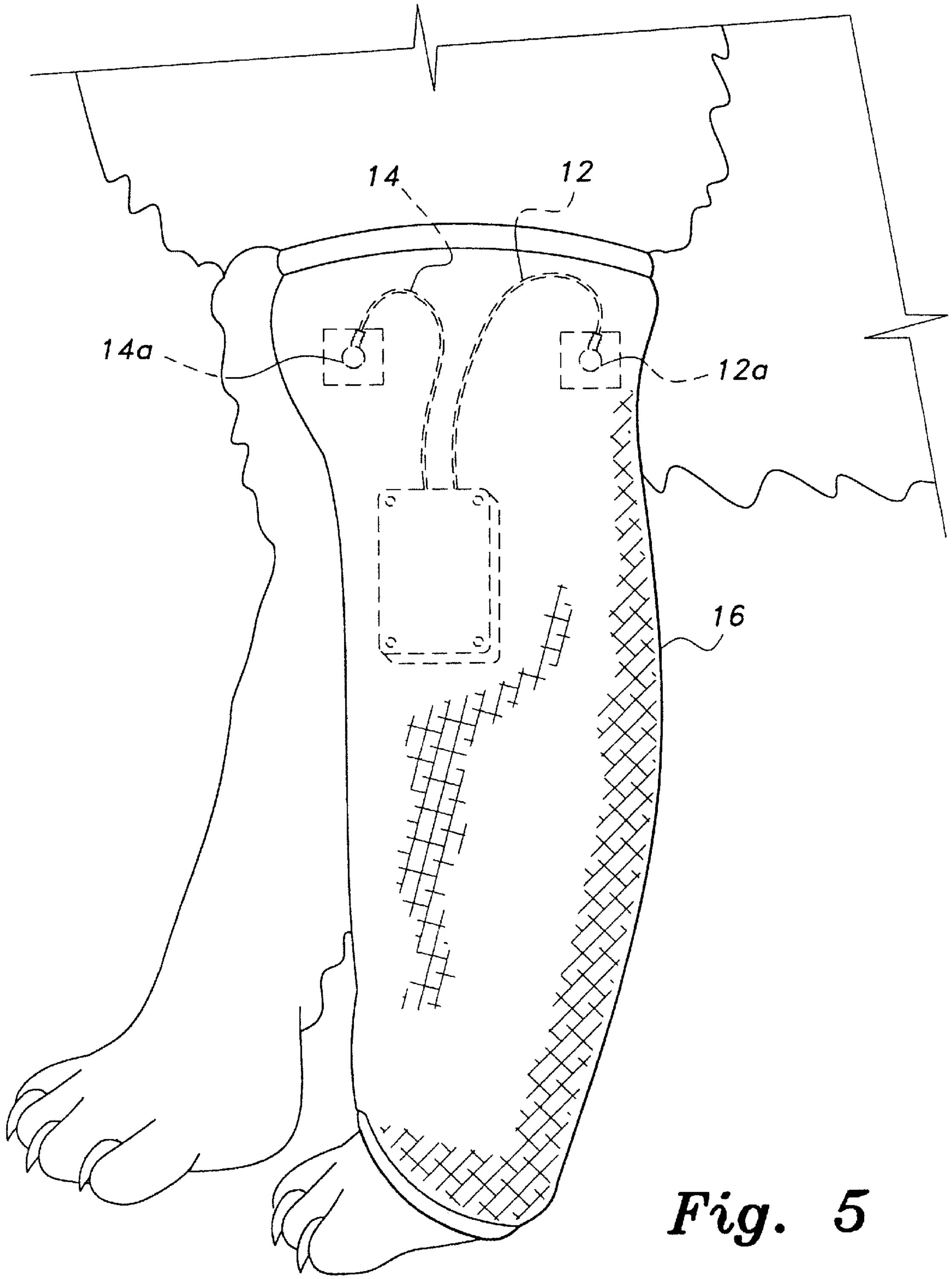
FIG. 5 is a perspective view illustrating a fourth step in applying the invention to the leg of a veterinary patient according to the present invention.

The final step, FIG. 5, requires that the bandaged area be covered with a flexible material 16. Material 16 is provided with an electrical conductive outer layer and an electrically insulated inner layer. Positive electrode 14*a* is attached to the outer layer in any suitable manner (adhesive, stitching, clips, etc.), thus forming an open electric circuit.

As noted above, the open circuit will be closed by the mouth or tongue if the patient attempts to lick or chew the covered area. The shock produced will most certainly discourage the patient from proceeding further.

Minor modifications to the above scenario will allow attachment of almost any medical appliance.

It is to be understood that the present invention is not limited to the sole embodiment described above, but encompasses any and all embodiments within the scope of the following claims.

I claim:

1. An electronic device adapted to discourage veterinary patients from licking and mutilating medical appliances which are attached to an anatomical area on the patient, said device comprising:

a casing, said casing housing an electrical power source;

an elongate first wire, said first wire having a proximate end connected to said casing and said electrical power source wherein said first wire extends from said casing and terminates at a distal end;

a first electrode, said first electrode attached to said distal end of said first wire;

an elongate second wire, said second wire having a proximate end connected to said casing and said electrical power source wherein said second wire extends from said casing and terminates at a distal end;

a second electrode, said second electrode attached to said distal end of said second wire;

a medical adhesive for attaching said first electrode to the anatomical area of the patient;

a flexible sheet for covering the anatomical area of the patient, said flexible sheet having an electrically conductive outer surface; and means for attaching said second electrode to said outer surface of said sheet.

2. An electronic device as recited in claim 1, wherein said first electrode has a negative polarity.

3. An electronic device as recited in claim 2, wherein said second electrode has a positive polarity.

4. An electronic device as recited in claim 3, wherein said flexible sheet has an electrically insulated inner surface.

5. An electronic device as recited in claim 4, including a layer of material interposing said first electrode and said flexible sheet material.

6. An electronic device as recited in claim 5, wherein said casing is encased in said layer of material.

7. An electronic device as recited in claim 6, wherein said layer of material is bandaging material.

8. An electronic device adapted to discourage veterinary patients from licking and mutilating medical appliances which are attached to an anatomical area on the patient, said device comprising:

a casing, said casing housing an electrical power source;

an elongate first wire, said first wire having a proximate end connected to said casing and said electrical power source wherein said first wire extends from said casing and terminates at a distal end;

a first electrode having a negative polarity, said first electrode attached to said distal end of said first wire;

an elongate second wire, said second wire having a proximate end connected to said casing and said electrical power source wherein said second wire extends from said casing and terminates at a distal end;

a second electrode having a positive polarity, said second electrode attached to said distal end of said second wire;

a medical adhesive for attaching said first electrode to the anatomical area of the patient;

a flexible sheet for covering the anatomical area of the patient, said flexible sheet having an electrically conductive outer surface;

means for attaching said second electrode to said outer surface of said sheet; and a layer of material interposing said first electrode and said flexible sheet material.

9. An electronic device as recited in claim 8, wherein said casing is encased in said layer of material.

10. An electronic device as recited in claim 9, wherein said layer of material is bandaging material.

11. An electronic device as recited in claim 10 wherein, said flexible sheet has an electrically insulated inner surface.

* * * * *